US012561465B2

(12) United States Patent
Panikkar

(10) Patent No.: US 12,561,465 B2
(45) Date of Patent: Feb. 24, 2026

(54) VIRTUAL REPRESENTATION OF INDIVIDUAL IN COMPUTING ENVIRONMENT

(71) Applicant: Dell Products L.P., Round Rock, TX (US)

(72) Inventor: Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 262 days.

(21) Appl. No.: 17/861,341

(22) Filed: Jul. 11, 2022

(65) Prior Publication Data

US 2024/0012922 A1 Jan. 11, 2024

(51) Int. Cl.
*G06F 9/451* (2018.01)
*G06F 21/62* (2013.01)

(52) U.S. Cl.
CPC .......... *G06F 21/6218* (2013.01); *G06F 9/451* (2018.02)

(58) Field of Classification Search
CPC ............................ G06F 21/6218; G06F 9/451
See application file for complete search history.

(56) References Cited

U.S. PATENT DOCUMENTS 11,216,261 B1    1/2022  Moyal et al.
12,034,785 B2 *  7/2024  Yerli ....................... G06F 3/011

| | | | |
|---|---|---|---|
| 2016/0196402 A1* | 7/2016 | Higashi ..................... G06F 3/14 |
| | | | 348/14.07 |
| 2017/0083962 A1* | 3/2017 | Agarwal ............ G06Q 30/0631 |
| 2019/0356556 A1 | 11/2019 | Vicat-Blanc | |
| 2020/0111490 A1* | 4/2020 | Jang ........................ G10L 15/22 |
| 2020/0322575 A1* | 10/2020 | Valli ...................... G03B 21/00 |
| 2021/0201588 A1* | 7/2021 | Yerli ....................... G06F 3/011 |
| 2021/0383611 A1 | 12/2021 | Kanski et al. | |
| 2022/0124140 A1* | 4/2022 | Okina .................. G06V 40/20 |
| 2023/0205737 A1* | 6/2023 | Cundall ................ G06F 16/176 |
| | | | 715/764 |
| 2023/0307101 A1* | 9/2023 | Ohnemus ............... G16H 40/67 |

OTHER PUBLICATIONS

A. Cichocki et al., "Era of Big Data Processing: A New Approach via Tensor Networks and Tensor Decompositions," arXiv:1403. 2048v4, Aug. 24, 2014, 30 pages.
C. Sonmez et al., "EdgeCloudSim," https://github.com/CagataySonmez/ EdgeCloudSim, Accessed Aug. 12, 2021, 11 pages.

(Continued)

*Primary Examiner* — Ali S Abyaneh

(74) *Attorney, Agent, or Firm* — Ryan, Mason & Lewis, LLP

(57)    ABSTRACT

Techniques are disclosed for managing virtual representations of individuals in a computing environment. For example, a method comprises rendering an interface in a first mode comprising a virtual representation of a first individual. The method then enables, through the rendered interface in a first mode, communication between the virtual representation of the first individual and a second individual, and permissioned access to data by the second individual. By way of further example, the method may also enable, through the rendered interface in a second mode, data management by the first individual.

20 Claims, 6 Drawing Sheets

500

502 — RENDER AN INTERFACE COMPRISING A VIRTUAL REPRESENTATION OF A FIRST INDIVIDUAL

504 — ENABLE, THROUGH THE RENDERED INTERFACE IN A FIRST MODE, COMMUNICATION BETWEEN THE VIRTUAL REPRESENTATION OF THE FIRST INDIVIDUAL AND A SECOND INDIVIDUAL AND PERMISSIONED ACCESS TO DATA BY THE SECOND INDIVIDUAL

506 — ENABLE, THROUGH THE RENDERED INTERFACE IN A SECOND MODE, DATA MANAGEMENT BY THE FIRST INDIVIDUAL

(56) References Cited

OTHER PUBLICATIONS

Melbourne Clouds Lab, "CloudSim: A Framework for Modeling and Simulation of Cloud Computing Infrastructures and Services," http://www.cloudbus.org/cloudsim/, Accessed Aug. 12, 2021, 8 pages.

ETSI, "MEC in 5G Networks," White Paper No. 28, ISBN No. 979-10-92620-22-1, Jun. 2018, 28 pages.

ETSI, "Multi-access Edge Computing (MEC); Application Mobility Service API," Group Specification MEC 021 V2.1.1, Jan. 2020, 47 pages.

ETSI, "ETSI MEC: An Introduction," Apr. 2021, 39 pages.

U.S. Appl. No. 17/380,372 filed in the name of Danqing Sha et al., filed Jul. 20, 2021, and entitled "Digital Twin Architecture for Multi-Access Edge Computing Environment."

U.S. Appl. No. 17/459,707 filed in the name of Danqing Sha et al., filed Aug. 27, 2021, and entitled "Digital Twin Architecture for Internet-Connected Device Computing Environment."

U.S. Appl. No. 17/506,888 filed in the name of Danqing Sha et al., filed Oct. 21, 2021, and entitled "Modularized Digital Twin Creation for Physical Infrastructure of Computing Environment."

U.S. Appl. No. 17/703,028 filed in the name of Madhukar Gaganam, filed Mar. 24, 2022, and entitled "Management of Virtual Representations in a Computing Environment Using Unique Identifiers."

* cited by examiner

EMPLOYEE MODE

200

202

204

206

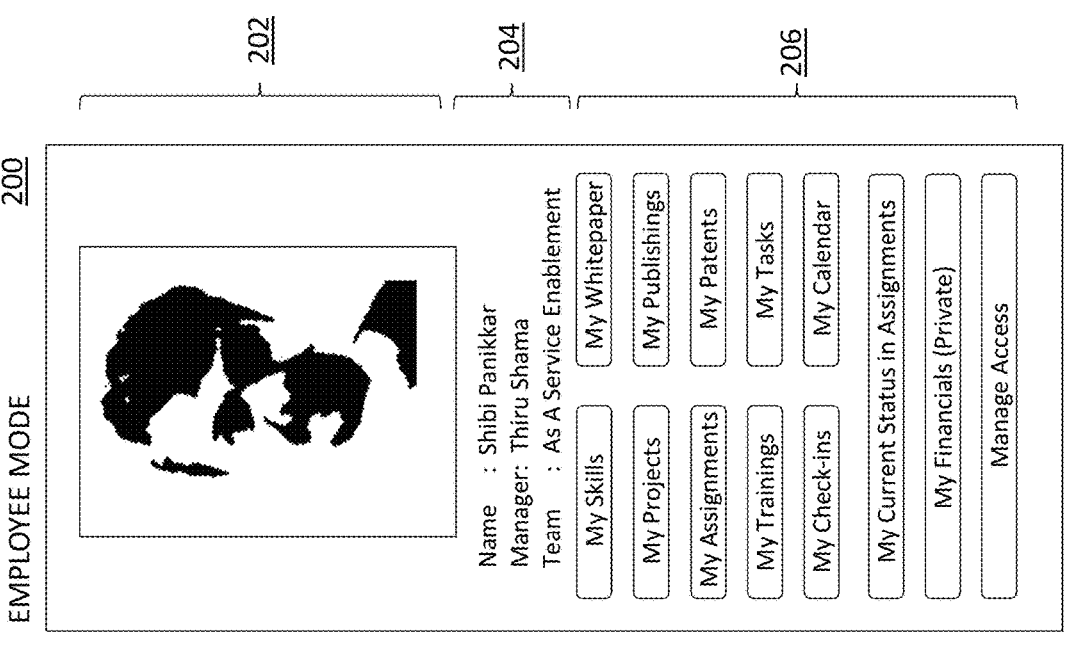

Name　: Shibi Panikkar
Manager: Thiru Shama
Team　: As A Service Enablement

My Skills

My Projects

My Assignments

My Trainings

My Check-ins

My Current Status in Assignments

My Financials (Private)

Manage Access

My Whitepaper

My Publishings

My Patents

My Tasks

My Calendar

FIG. 2A

ORGANIZATION MODE

220

202

204

228

226

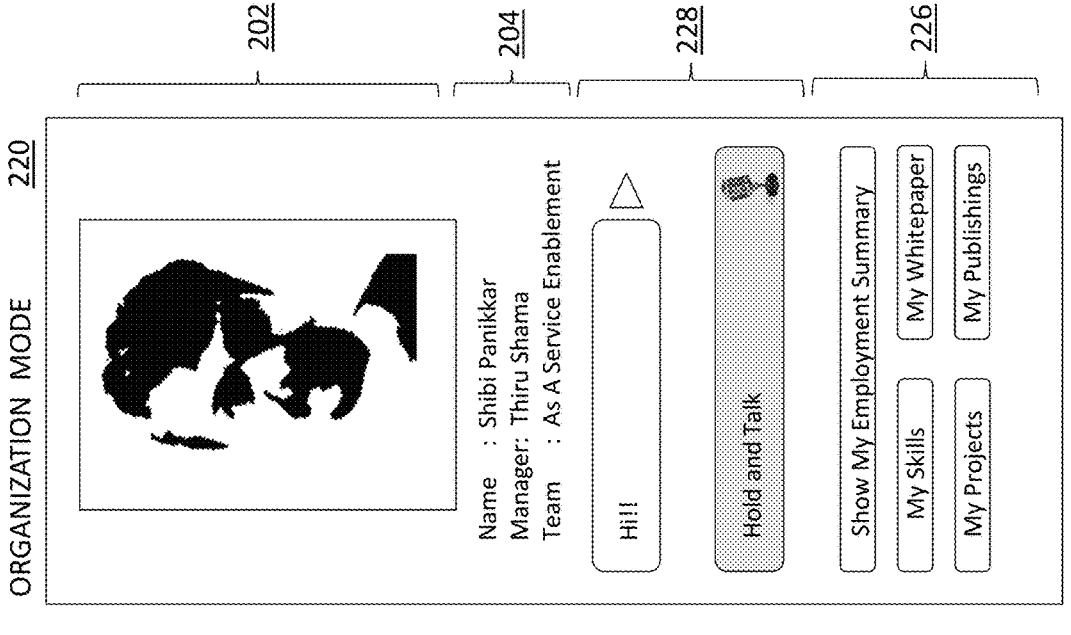

Name　: Shibi Panikkar
Manager: Thiru Shama
Team　: As A Service Enablement

Hi!!

Hold and Talk

Show My Employment Summary

My Skills

My Whitepaper

My Projects

My Publishings

FIG. 2B

Figure 3:
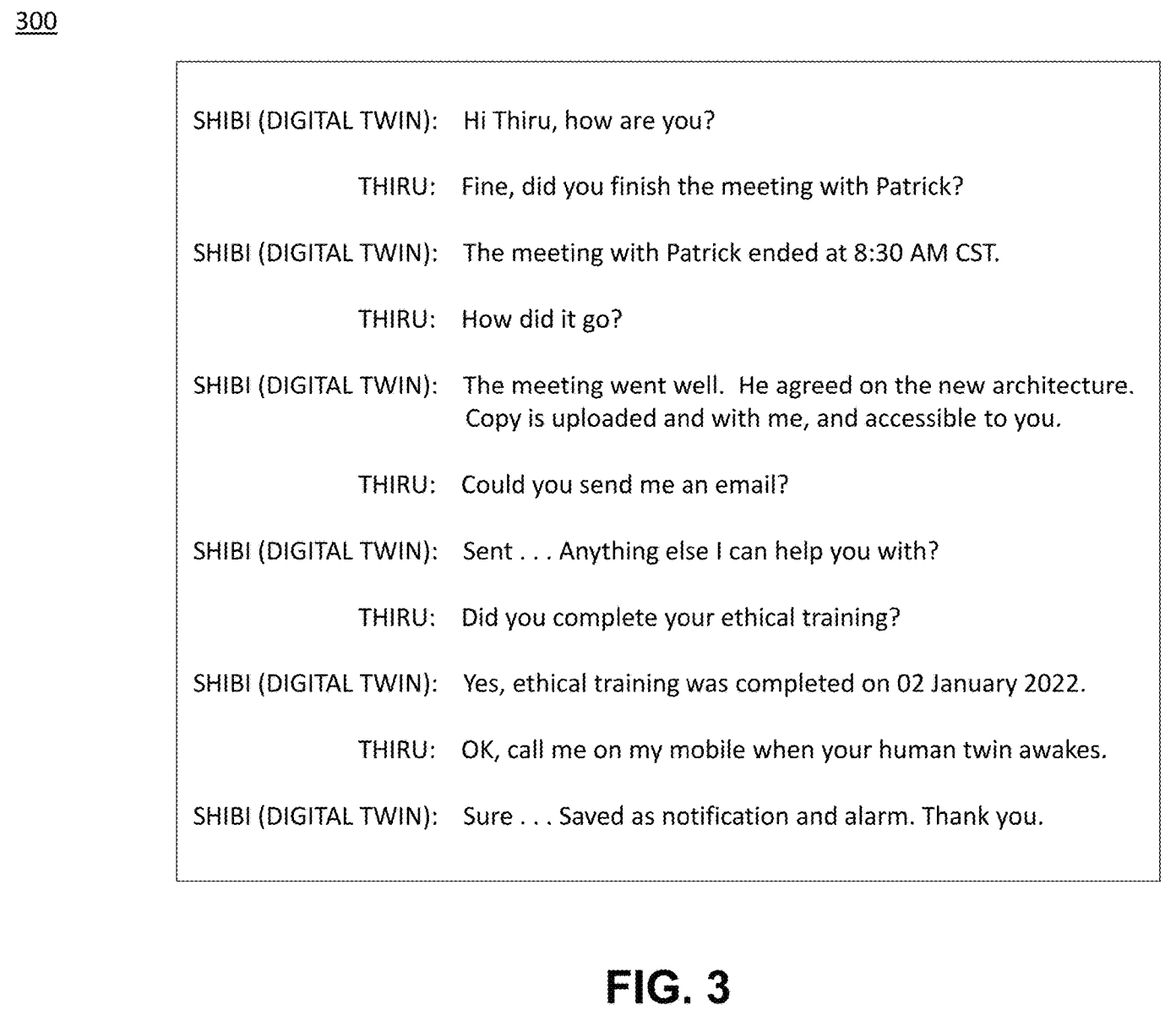

SHIBI (DIGITAL TWIN):    Hi Thiru, how are you?

THIRU:    Fine, did you finish the meeting with Patrick?

SHIBI (DIGITAL TWIN):    The meeting with Patrick ended at 8:30 AM CST.

THIRU:    How did it go?

SHIBI (DIGITAL TWIN):    The meeting went well. He agreed on the new architecture. Copy is uploaded and with me, and accessible to you.

THIRU:    Could you send me an email?

SHIBI (DIGITAL TWIN):    Sent . . . Anything else I can help you with?

THIRU:    Did you complete your ethical training?

SHIBI (DIGITAL TWIN):    Yes, ethical training was completed on 02 January 2022.

THIRU:    OK, call me on my mobile when your human twin awakes.

SHIBI (DIGITAL TWIN):    Sure . . . Saved as notification and alarm. Thank you.

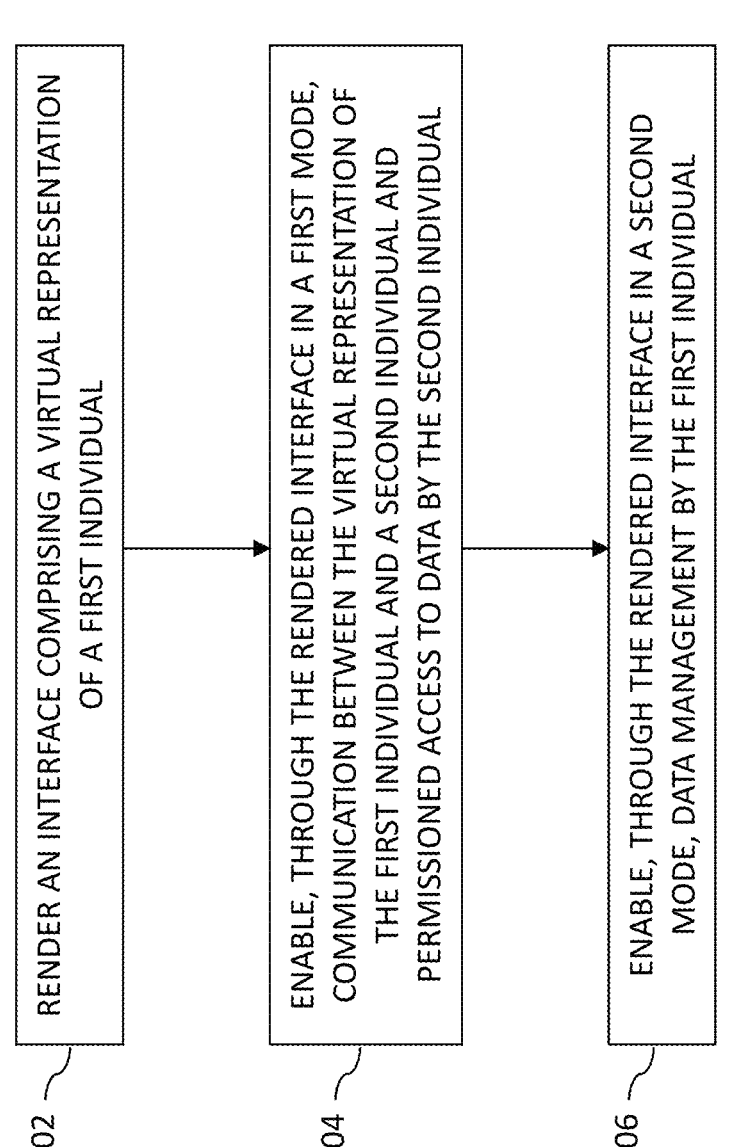

500

502 — RENDER AN INTERFACE COMPRISING A VIRTUAL REPRESENTATION OF A FIRST INDIVIDUAL

504 — ENABLE, THROUGH THE RENDERED INTERFACE IN A FIRST MODE, COMMUNICATION BETWEEN THE VIRTUAL REPRESENTATION OF THE FIRST INDIVIDUAL AND A SECOND INDIVIDUAL AND PERMISSIONED ACCESS TO DATA BY THE SECOND INDIVIDUAL

506 — ENABLE, THROUGH THE RENDERED INTERFACE IN A SECOND MODE, DATA MANAGEMENT BY THE FIRST INDIVIDUAL

FIG. 5

VIRTUAL REPRESENTATION OF INDIVIDUAL IN COMPUTING ENVIRONMENT

FIELD

The field relates generally to computing environments, and more particularly to enabling and managing virtual representations (e.g., digital twins) of individuals in such computing environments.

BACKGROUND

It is realized that in any enterprise or other organization, employees are important to the operation of that enterprise as they include individuals who perform a multitude of critical tasks. As such, person to person communication is vital for addressing goals in the enterprise. When it comes to a global enterprise, face to face interaction between employees is often not possible. Thus, there are many communication tools available for use in virtually connecting employees who are remote from one another, as well as human resource tools for maintaining employee skill and/or scheduling details to enable employees to coordinate their work efforts and/or communicate.

However, these tools are distributed and can present difficulties in finding relevant details about a fellow employee. Thus, accessing all of these disparate tools to communicate in a work related or even personal manner, or understanding another employee's availability and/or professional skills, is not optimal. Even if one employee is able to speak with another employee in a chat tool, some scenarios may require a person to use still other tools to complete the inquiry. This can be time consuming and otherwise frustrating for employees and other participants, as well as detrimental to the operations of the enterprise.

SUMMARY

Embodiments provide techniques for managing virtual representations of individuals in a computing environment.

For example, according to one illustrative embodiment, a method comprises rendering an interface in a first mode comprising a virtual representation of a first individual. The method then enables, through the rendered interface in a first mode, communication between the virtual representation of the first individual and a second individual, and permissioned access to data by the second individual.

In a further illustrative embodiment, the method may also enable, through the rendered interface in a second mode, data management by the first individual.

Further illustrative embodiments are provided in the form of a non-transitory computer-readable storage medium having embodied therein executable program code that when executed by a processor causes the processor to perform the above steps. Additional illustrative embodiments comprise an apparatus with a processor and a memory configured to perform the above steps.

Advantageously, illustrative embodiments enable creation and display of virtual representations (e.g., digital twins), as well as other management functionalities, in a computing environment (e.g., a distributed computing environment) enabling improved communication and information sharing among individuals, e.g., employees in an enterprise (such as managers and staff members). More particularly, through the use of a digital twin architecture, illustrative embodiments enable others to virtually communicate effectively with an employee's digital twin with respect to anything that the employee has given consent to the digital twin to communicate.

These and other features and advantages of embodiments described herein will become more apparent from the accompanying drawings and the following detailed description.

BRIEF DESCRIPTION OF THE DRAWINGS

FIG. 2A illustrates a digital twin interface in a first mode according to an illustrative embodiment.

FIG. 2B illustrates a digital twin interface in a second mode according to an illustrative embodiment.

FIG. 3 illustrates a sample conversation through a digital twin interface in a second mode according to an illustrative embodiment.

FIG. 5 illustrates a methodology for managing a digital twin architecture according to an illustrative embodiment.

DETAILED DESCRIPTION

Figure 1:
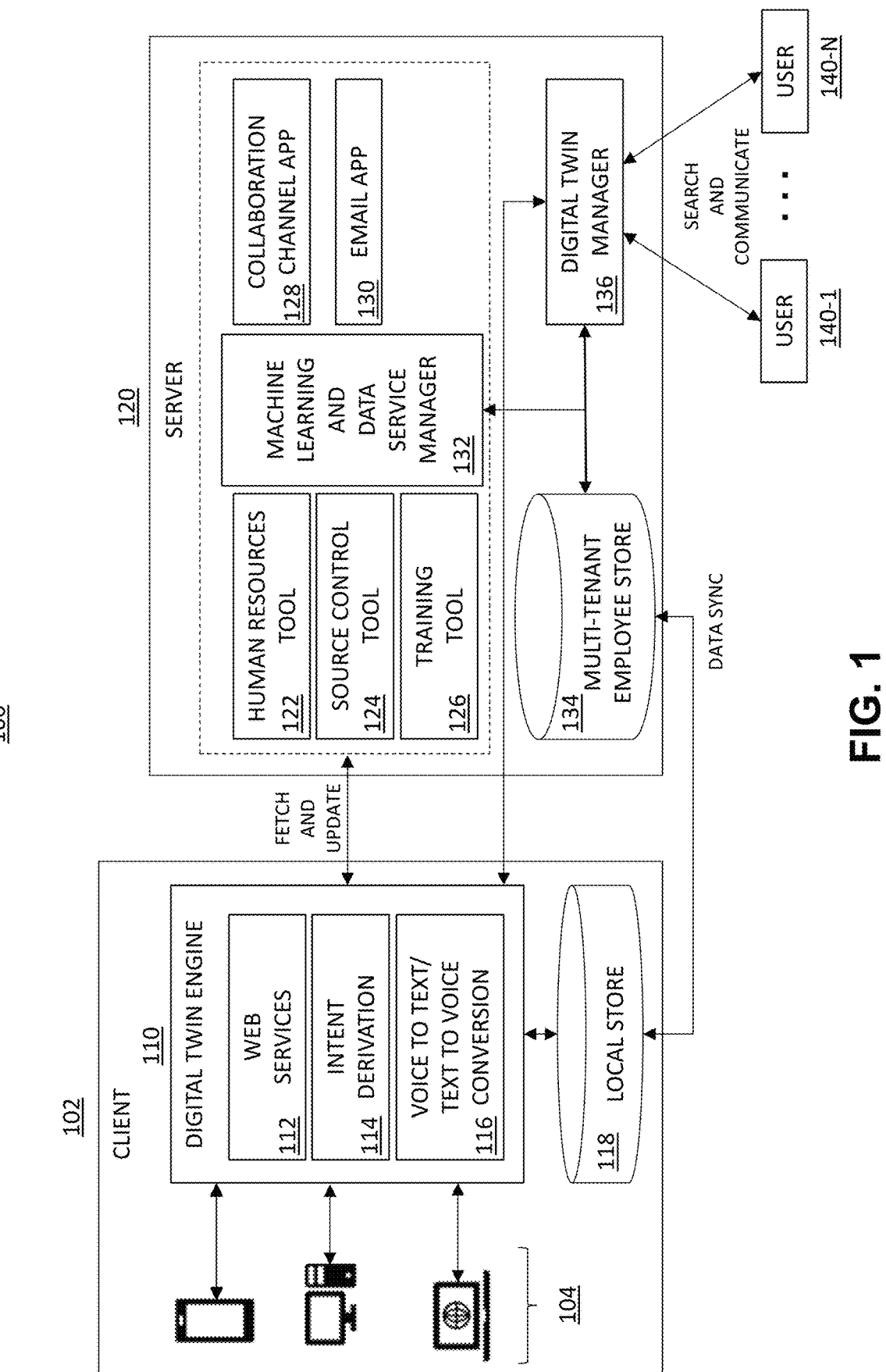
FIG. 1 illustrates a digital twin architecture in a computing environment according to an illustrative embodiment.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

As illustratively used herein, the term "digital twin" refers to a virtual representation or a virtual copy of a physical (e.g., actual or real) item such as, but not limited to, a system, a device, and/or processes associated therewith, as well as a physical entity such as, but not limited to, an individual or group of individuals such as, but not limited to, an employee or employees in an organization.

Illustrative embodiments overcome the above and other technical issues associated with the myriad of conventional human resource and communication tools by providing a digital twin architecture that enables virtual communication, i.e., communication between a human and a virtual representation of another person. More particularly, illustrative embodiments propose an interactive image (e.g., an animation/photo) representation of an employee in a mobile application, web interface application, and/or desktop client application, which virtually represents the employee (i.e., the employee's digital twin) for that organization. The application in some illustrative embodiments is based on natural language processing (NLP) technologies with voice capabilities. However, other linguistic artificial intelligence/machine learning (AI/ML) techniques can be applied in alternative embodiments. The digital twin architecture not only brings a personal touch similar to a face to face interaction, but also makes permissioned information available to a human user within microseconds through use of the digital twin as an interface.

In some illustrative embodiments, the digital twin architecture is configurable to selectively operate in two modes: (i) an employee mode; and (ii) an organization mode.

The employee mode is for the employee's private (inward-facing) use. The employee can view/update employee details in the employee mode. Further, in the employee mode, the employee can set secure access (permissioned access) of information to different categories of other employees in the organization (e.g., manager, human resources, team, specific groups, public, etc.). In some illustrative embodiments, the digital twin architecture is configured to enable the employee to give consent before sharing information with others that have not yet expressly been given secure access.

The organization mode represents the employee's digital/ virtual representation to the organization and is for public (outward-facing) use. In the organization mode, other employees can view details, ask questions to the employee's digital twin, and receive replies therefrom within a mobile, web, or desktop application environment. The digital twin of the employee answers the queries and otherwise performs allowable interactive activities according to one or more personas associated with a digital avatar of the employee, as will be further illustrated herein.

FIG. 1 illustrates a digital twin architecture 100 implemented within a computing environment according to an illustrative embodiment. As shown in digital twin architecture 100, a client 102 is operatively coupled to a server 120. Depending on the organization in which the digital twin architecture 100 is implemented, client 102 and server 120 can be operatively coupled by one or more communication networks including, but not limited to, public networks such as, e.g., the world wide web, and/or private networks such as, e.g., local area networks or other private communication channels. The digital twin architecture 100 is not limited to any particular type of communication network or channel, or even to a client/server environment.

As further shown, client 102 is comprised of one or more computing devices 104 (as illustrated, a smart phone, a desktop, and a laptop) operatively coupled to a digital twin engine 110, as well as a local store 118 operatively coupled to digital twin engine 110. Digital twin engine 110, as shown, comprises multiple modules including, but not limited to, a web services module 112, an intent derivation module 114, and a voice to text/text to voice conversion module 116.

Still further, server 120 is comprised of multiple modules comprising a human resources (HR) tool 122 (e.g., Workday, ServiceNow, etc.), a source control tool 124 (e.g., TFS, Jeera, etc.), a training tool 126 (e.g., Saba, etc.), a collaboration channel application 128 (e.g., Teams, Zoom, etc.), and an email application 130 (e.g., Outlook, etc.), which are each operatively coupled to a machine learning (ML) and data service manager 132 operatively coupled to a multi-tenant employee store 134. Server 120 also comprises a digital twin manager 136 operatively coupled to ML and data service manager 132 and multi-tenant employee store 134, as shown.

As will be explained in further detail below, digital twin engine 110 fetches data from and/or updates data to one or more of the modules managed by ML and data service manager 132. Note also that local store 118 synchronizes its data with multi-tenant employee store 134. It is to be appreciated that server 120 is operatively coupled to a plurality of clients (not expressly shown in FIG. 1), identical to or at least similar to client 102, corresponding to a plurality of employees for which digital twins are created and managed, and thus performs fetch, update and sync operations with each of the plurality of clients. It is to be understood that the term "employee" as used in illustrative embodiments herein is intended to include any individual or person in an organization, and may more generally be referred to as an "individual," a "user," a "participant," and the like.

Client 102 and server 120 can include other modules not expressly shown, or include less modules than that expressly shown, in alternative embodiments, depending on the nature of the computing environment in which digital twin architecture 100 is implemented.

In some illustrative embodiments, all or portions of digital twin architecture 100 can be implemented in a set of application programs such as, by way of example only, an executable file that is deployed in the computing devices (e.g., smart phones, laptops, desktops, etc., shown in FIG. 1 as 104 or the like) of all employees, a mobile application program that is deployed in a mobile workspace of the organization, and a web application program accessible via an internal portal of the organization (e.g., on server 120 or the like).

For example, in a given illustrative embodiment, when the employee laptop is opened or otherwise turned on following deployment of the digital twin architecture 100, basic (default) information about the employee from human resources, source control, and/or training is automatically fetched from server 120 from the corresponding tools 122, 124, and 126, and stored in local store 118.

When the employee digital twin is opened by the employee, by causing execution of digital twin engine 110, in any of the client applications, it opens in a first mode referred to as an employee mode. FIG. 2A illustrates a digital twin interface 200 in the employee mode rendered (generated and displayed or caused to be generated and displayed) by digital twin engine 110 on client 102, according to an illustrative embodiment. As shown, digital twin interface 200 comprises an image 202 visually representing the employee. Note that image 202 of the employee can be an actual digital photo or a digital avatar, or some other visual representation, that is static or animated. Further, digital twin interface 200 also comprises a set of fields 204 identifying the employee's name, manager in the organization, and organization team to which the employee belongs. Still further, digital twin interface 200 comprises a set of buttons 206 (e.g., selectable via touch screen or pointing device on client 102) that each respectively launch program code that manages a variety of employee features and functionalities, and that allow the employee to view and/or update data describing the employee's skills, assignments, training, projects, writings, patents, etc., as well as calendar/scheduling information, and other data (e.g., financial or otherwise). The employee is also able to manage access rules, by selecting the appropriate button, to set permissions as to who can and cannot access different types of data of the employee through the digital twin architecture 100. Note that changes made by the employee through the employee mode to data are stored locally and then sent to server 120 to update the corresponding tools managed thereon.

By way of example only, the employee can update image 202, change information in the set of fields 204, and alter information such as a mailing address that is updated both locally on client 102 and remotely at server 120. Similarly, the employee can view and/or update past, present, and future projects, tasks, assignments, writings, calendar schedules, etc., through one or more of the set of buttons 206. All the data updates are stored in local store 118 and then synced to server 120 for serving others who have access thereto in the organization mode, as will be further explained below.

With reference back to FIG. 1, digital twin manager 136 of server 120 enables employees, more generally depicted as users 140-1, . . . , 140-N (hereinafter collectively referred to as users 140 or individually as user 140), to search for one or more other employees' digital twins to communicate and obtain information as desired/required. Note that users 140 can represent computing devices associated with the individuals searching for a particular employee digital twin and, in some embodiments, the user computing devices can be configured similar or identical to client 102.

For example, in some embodiments, a user 140 opens a search page rendered by digital twin manager 136 and selects a search digital twin function (e.g., clicks on a button). User 140 can then enter an employee name, an employee identifier (ID), an employee email address, or some other employee-specific identifying indicia, and digital twin manager 136 searches multi-tenant employee store 134 based on the identifying indicia and loads (or causes to be loaded) the digital twin interface of the found employee. It is to be understood that the loaded digital twin interface is rendered in the organization mode.

More particularly, assuming the searched employee is the employee associated with client 102, digital twin manager 136 of server 120 is configured to connect user 140 with digital twin engine 110 of client 102 such that user 140 can then communicate with the digital twin of the employee, as will be further illustrated below, and obtain information therefrom. Note that, in some alternative embodiments with peer to peer functionality, user 140 can be connected directly with client 102 rather than through server 120.

FIG. 2B illustrates a digital twin interface 220 in the organization mode rendered (generated and displayed) by digital twin manager 136 of server 120 on the computing device of user 140, according to an illustrative embodiment. As shown, digital twin interface 220 comprises image 202 visually representing the employee and the set of fields 204 identifying the employee's name, manager in the organization, and organization team to which the employee belongs, e.g., the same as in the employee mode of FIG. 2A.

Further, digital twin interface 220 comprises a set of buttons 226 (e.g., selectable via touch screen or pointing device) that each respectively launch program code that enables permissioned access of information pertaining to the employee (e.g., employment, skills, projects, writings, etc.). Note that this information associated with set of buttons 226 is limited to what the employee of client 102 wants other employees to have access to, and may not include all types of information that the employee is otherwise able to manage in employee mode (e.g., via set of buttons 206 of digital twin interface 200 in FIG. 2A).

Still further, digital twin interface 220 comprises a set of communication fields and buttons 228 (e.g., selectable via touch screen or pointing device) that launch program code that enables user 140 to communicate with the digital twin of the employee. For example, user 140 can enter a query or statement via text in a field and/or select a speaking option where user 140 is able to speak the query or statement (assuming the computing device of user 140 has a microphone). Responses from the digital twin of the employee are then either displayed in the text field and/or spoken (assuming the computing device of user 140 has a speaker). Thus, advantageously, user 140 is able to communicate with a virtual representation of another human via digital twin interface 220 when the other human is unavailable or otherwise not able/willing to engage in a face to face communication (remote or otherwise).

By way of example only, FIG. 3 illustrates a sample conversation 300 through digital twin interface 220 according to an illustrative embodiment. More particularly, in sample conversation 300, assume that "Shibi" is the employee associated with client 102 whose digital twin is being represented via digital twin interface 220 and "Thiru" is the individual associated with user 140 and Shibi's manager who is communicating with Shibi's digital twin ("Shibi (Digital Twin)") while Shibi is unavailable. Assume that Thiru wants to find out about a meeting he asked Shibi to have and the result of that meeting, as well as checking if Shibi completed a training class since Thiru wants to update his own boss. Also, assume that Thiru and Shibi are in different geographic time zones (e.g., US and India, respectively) and thus, due to the time difference, cannot speak directly, i.e., Shibi may be asleep or otherwise unavailable while Thiru is at work. The sample conversation 300 proceeds a follows:

Shibi (Digital Twin): Hi Thiru, how are you?
Thiru: Fine, did you finish the meeting with Patrick?
Shibi (Digital Twin): The meeting with Patrick ended at 8:30 AM CST.
Thiru: How did it go?
Shibi (Digital Twin): The meeting went well. He agreed on the new architecture.
Copy is uploaded with me, and accessible to you.
Thiru: Could you send me an email?
Shibi (Digital Twin): Sent . . . Anything else I can help you with?
Thiru: Did you complete your ethical training?
Shibi (Digital Twin): Yes, ethical training was completed on 2 Jan. 2022.
Thiru: OK, call me on my mobile when your human twin awakes.
Shibi (Digital Twin): Sure . . . saved as notification and alarm. Thank you.

In this scenario, assume Shibi previously used the employee mode of his digital twin interface (200 of FIG. 2A) to add a schedule meeting task (with Patrick) and results of the meeting were added in the digital twin architecture 100, as well as information on the status of Shibi's training in accordance with a training portal (tool 126) that has knowledge of the status.

In terms of the digital twin architecture 100 depicted in the computing environment of FIG. 1, details on the execution of sample conversation 300 will now be explained.

When the scheduled meeting with Patrick is added by Shibi via digital twin interface 200 of FIG. 2A, collaboration channel application 128 (e.g., which may comprise Teams or Zoom) is updated with the details and creates a meeting ID. Then, after the meeting, results or other notes can be entered by Shibi via digital twin interface 200, associated with the meeting ID, stored locally in local store 118 and remotely in multi-tenant employee store 134, and tagged to whomever Shibi wishes to give access to the results, e.g., his manager, Thiru. Thus, in the organization mode (i.e., digital twin interface 220 of FIG. 2B), the results will only be available to Thiru. Still further, a copy of the agreed upon architecture that came out of the meeting can be uploaded via digital twin interface 200 of FIG. 2A, and again tagged to the manager so that only he will have access in digital twin interface 220 of FIG. 2B. Shibi can also complete the ethical training via digital twin interface 200 of FIG. 2A, the status of which is then updated in training tool 126.

Note that the above and other tasks/actions can be accomplished via web services in one or more illustrative embodiments. That is, web services module 112 in client 102 is configured to interface with each of the modules 122-132 in server 120 which have their own web service functionalities.

For example, collaboration channel application 128 (e.g., Teams/Zoom) is configured with the following web services functionality:

(i) GetMeetingDetailsByMeetingID attaches to intent "Meeting_Details" (this service gives a from/to list of the meeting and meeting notes if any); and (ii) GetMeetingIDByName attaches to the intent "MeetingID_By_Name" (this service gives the meeting ID of the latest meeting by name).

Digital twin engine 110 is configured with the following web service functionalities:

(i) GetTaskStatusByID;

(ii) GetMeetingStatusByName—attach to intent "Meeting_Status_By_Name"; and (iii) SendMailWithAttachment—attach to the intent "SEND_MAIL_WITH_ATTACHMENT".

Training tool 126 is configured with the following web service functionalities:

(i) GetStatusOfTraiingByName—attach to the intent "Status_of_Training_Name"; and (ii) GetLastCompletedTraining—attach to intent "Status_Of_Training".

Accordingly, with the above and other functionalities, below is an example scenario that may be executed in one or more illustrative embodiments:

(i) When Thiru opens the digital twin interface for Shibi in organization mode (220 of FIG. 2B), the digital twin architecture 100 knows the manager opened it based on his NT/ID and also has his email ID.

(ii) When Thiru asked (in sample conversation 300) "did you finish the meeting with Patrick?," intent derivation module 114 derives the intent (e.g., using a conventional NLP algorithm) as "Meeting_Status_By_Name", and thus calls "GetMeetingStatusByName" which performs or causes to be performed the following:

a. calls "GetMeetingIDByName" of Teams/Zoom to get the last meeting ID with the name "Patrick";

b. calls "GetMeetingDetailsByMeetingID" to get the meeting status;

c. calls "GetTaskStatus" by MeetingID (this takes precedence, if the employee updated the task status in his digital twin);

d. returns the task status as "the meeting went well. He agreed on the new architecture. Copy is uploaded and with me, and accessible to you?";

e. coverts the text to voice in module 116 in "employee's voice" (Shibi's voice) using his voice sampling;

f. when Thiru asks "could you please send me an email?", the context is uploaded as a PowerPoint (PPT) document and the intent derived is "SEND_MAIL_WITH_ATTACHMENT"; and g. this intent is attached to the SendMailWithAttachment service such that the digital twin architecture 100 takes Thiru's email and PPT reference and calls "SendMailWithAttachment", which in turn calls SEND_MAIL of email application 130 (e.g., Outlook).

(iii) When Thiru asks "did you complete your ethical training?", the NLP algorithm resolves "ethical training" as "ethical and compliance training" and resolves the intent "GetStatusOfTrainingByName". The digital twin architecture 100 calls this method in training tool 126 to get the status of Shibi's training by passing the NT ID of his digital twin.

(iv) When Thiru asks to call him when "human twin awakes", intent is "CREATE_TASK" with the created text. Thus, the digital twin architecture 100 creates a task, assigns it to Shibi, and sends a notification (e.g., call Thiru as soon as you awake).

Figure 4:
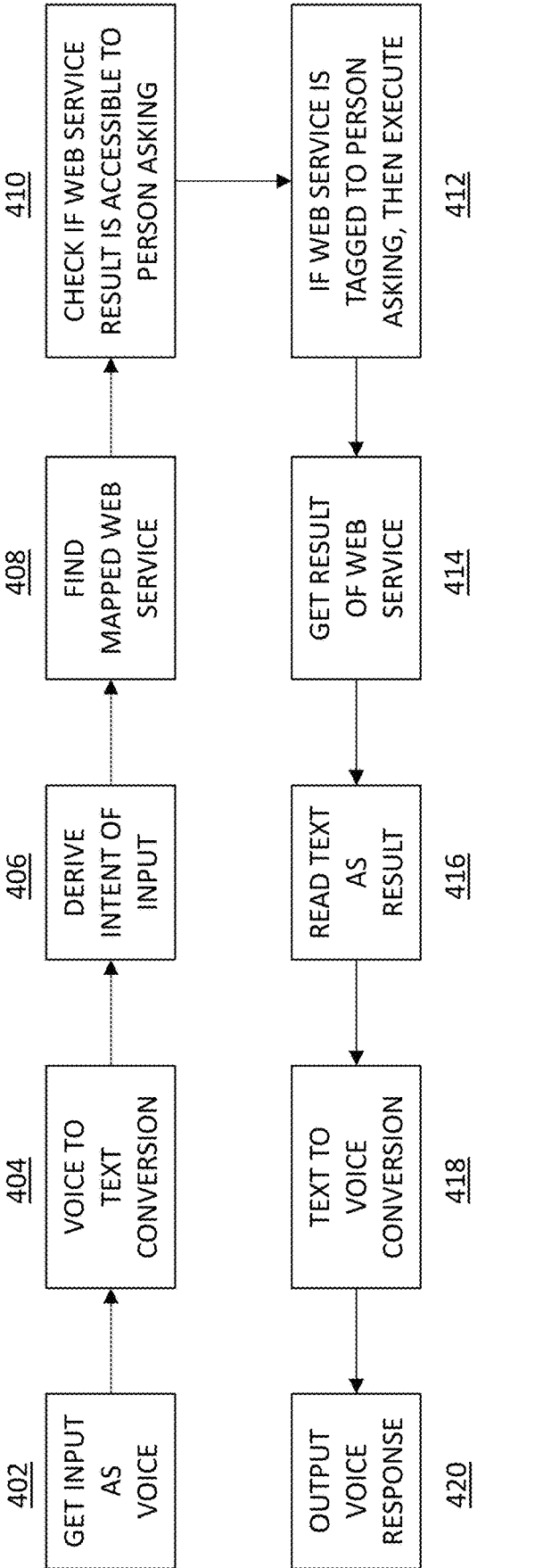
FIG. 4 illustrates a process flow for generating a conversation through a digital twin architecture according to an illustrative embodiment.

FIG. 4 summarizes a process flow 400 within the digital twin architecture 100 according to an illustrative embodiment. It is to be appreciated that process flow 400 is depicted from a perspective of digital twin engine 110 of client 102 including web services module 112, intent derivation module 114, and voice to text/text to voice conversion module 116 (referred to more simply as module 112, module 114, and module 116 below).

As shown, step 402 obtains a voice input, e.g., one of the questions by the manager in sample conversation 300 described above (e.g., did you complete your ethical training?). Step 404 converts the voice to text (module 116) and an intent of the query in the text is derived (module 114) in step 406.

Next, step 408 finds a mapped web service based on the intent derived for the query (e.g., module 112 interfaces with a web service of training tool 126). Step 410 then checks whether or not the person asking the question has been given access (tagged) to obtain this information and if so, then the request for the information via the web service is executed in step 412 (via training tool 126). Step 414 returns the results of the web service (module 112 receives results from training tool 126) which are read as text in step 416 and converted to voice (module 116) in step 418. The voice response to the query (e.g., yes, ethical training was completed on 2 Jan. 2022) is output in step 420.

Accordingly, in one or more illustrative embodiments, the digital twin architecture 100 models a digital twin of the employee as an animated avatar and integrates voice samples from the employee and synchronizes lip movement with the converted text while the image 202 is speaking. Thus, image 202 of digital twin interface 220 is animated and the lip movement of the animation is synchronized with the voice response output in step 420. Such animated avatar and lip synchronization can utilize existing animation technologies known to those of ordinary skill in the art.

Note that the digital twin functionalities described herein can be implemented at one or more computing devices including, client 102, server 120, a computing device of user 140, and combinations thereof. More particularly, the digital twin functionalities according to embodiments described herein are not limited to any particular processing platform.

FIG. 5 illustrates a methodology 500 for enabling and managing a digital twin architecture according to an illustrative embodiment. As shown, step 502 renders (generates and displays or causes to generate and display) an interface in a first mode (e.g., an organization/public/outward-facing mode) comprising a virtual representation of a first individual. Step 504 enables, through the rendered interface in a first mode, communication between the virtual representation of the first individual and a second individual, and permissioned access to data by the second individual. Note that, in some embodiments, permissioned access is given in advance by the first individual. Step 506 enables, through the rendered interface in a second mode (e.g., an employee/private/inward-facing mode), data management by the first individual. Illustrative details and examples of these steps are explained in detail herein.

Illustrative embodiments are described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Cloud infrastructure can include private clouds, public clouds, and/or combinations of private/public clouds (hybrid clouds).

Figure 6:
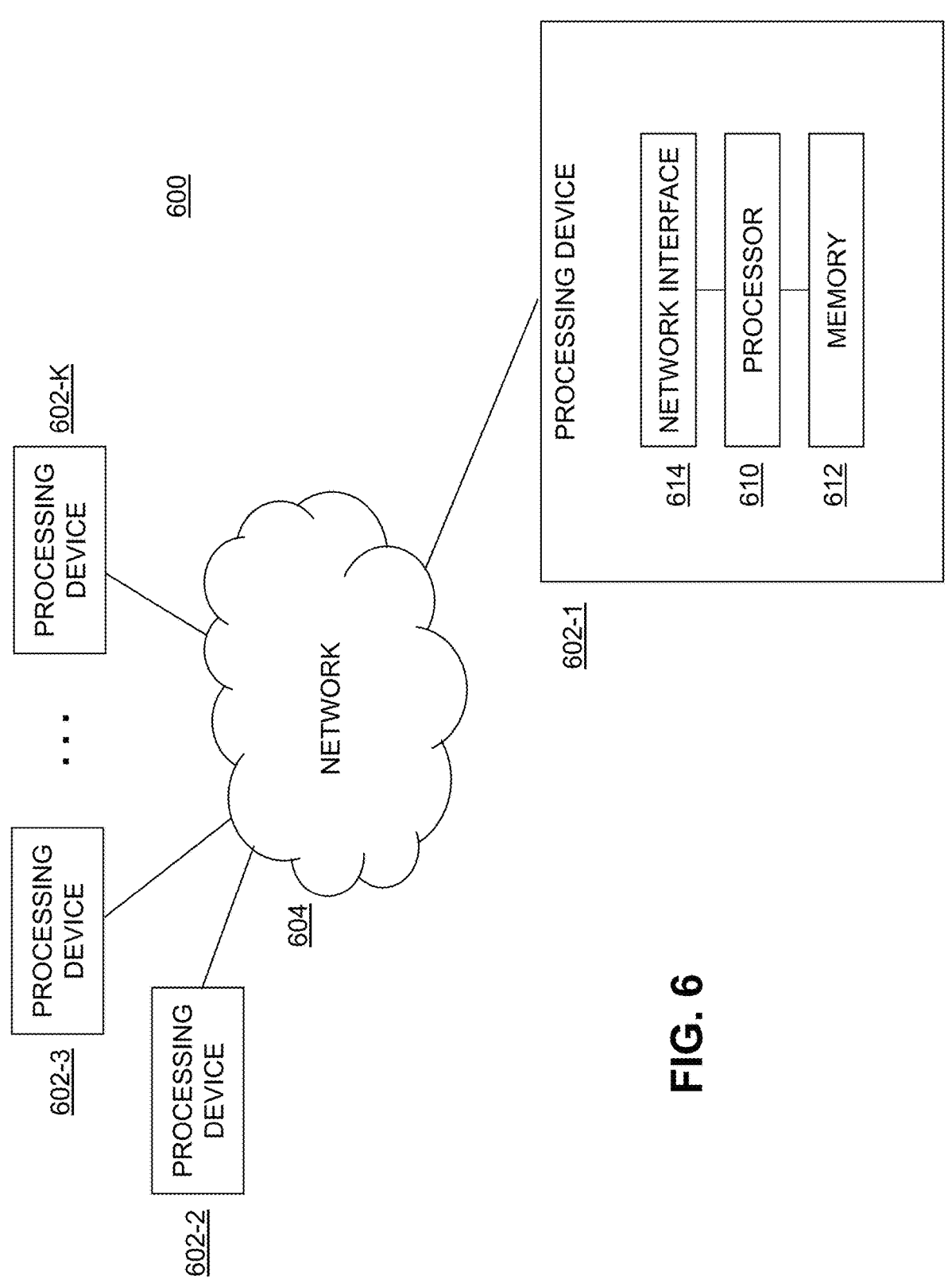
FIG. 6 illustrates a processing platform for an information processing system used to implement a digital twin architecture in a computing environment according to an illustrative embodiment.

FIG. 6 illustrates a processing platform 600 used to implement architectures/systems/processes/data 100 through 500 depicted in FIGS. 1 through 5 respectively, according to an illustrative embodiment. More particularly, processing platform 600 is a processing platform on which a computing environment with functionalities described herein can be implemented.

The processing platform 600 in this embodiment comprises a plurality of processing devices, denoted 602-1, 602-2, 602-3, . . . 602-K, which communicate with one another over network(s) 604. It is to be appreciated that the methodologies described herein may be executed in one such processing device 602, or executed in a distributed manner across two or more such processing devices 602. It is to be further appreciated that a server, a client device, a computing device or any other processing platform element may be viewed as an example of what is more generally referred to herein as a "processing device." As illustrated in FIG. 6, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 602 shown in FIG. 6. The network(s) 604 represent one or more communications networks that enable components to communicate and to transfer data therebetween, as well as to perform other functionalities described herein.

The processing device 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 610. Memory 612 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 612 may comprise electronic memory such as random-access memory (RAM), read-only memory (ROM) or other types of memory, in any combination. The one or more software programs when executed by a processing device such as the processing device 602-1 causes the device to perform functions associated with one or more of the components/steps of system/methodologies in FIGS. 1 through 5. One skilled in the art would be readily able to implement such software given the teachings provided herein. Other examples of processor-readable storage media embodying embodiments of the invention may include, for example, optical or magnetic disks.

Processing device 602-1 also includes network interface circuitry 614, which is used to interface the device with the networks 604 and other system components. Such circuitry may comprise conventional transceivers of a type well known in the art.

The other processing devices 602 (602-2, 602-3, . . . 602-K) of the processing platform 600 are assumed to be configured in a manner similar to that shown for computing device 602-1 in the figure.

The processing platform 600 shown in FIG. 6 may comprise additional known components such as batch processing systems, parallel processing systems, physical machines, virtual machines, virtual switches, storage volumes, etc. Again, the particular processing platform shown in this figure is presented by way of example only, and the system shown as 600 in FIG. 6 may include additional or alternative processing platforms, as well as numerous distinct processing platforms in any combination.

Also, numerous other arrangements of servers, clients, computers, storage devices or other components are possible in processing platform 600. Such components can communicate with other elements of the processing platform 600 over any type of network, such as a wide area network (WAN), a local area network (LAN), a satellite network, a telephone or cable network, or various portions or combinations of these and other types of networks.

Furthermore, it is to be appreciated that the processing platform 600 of FIG. 6 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 600 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-6 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus, comprising:
a processing platform comprising at least one processor and at least one memory storing computer program instructions wherein, when the at least one processor executes the computer program instructions, the apparatus is configured to:
render an interface comprising a virtual representation of a first individual, wherein the rendered interface is configured to selectively operate in a first mode and a second mode, the virtual representation of the first individual being automatically iteratively updated in the second mode with data corresponding to the first individual;
in response to the first individual setting an availability status as being unavailable, enable, through the rendered interface in the first mode: communication between the virtual representation of the first individual and a second individual in response to one or more communication requests from the second individual, permissioned access to data by the second individual through one or more allowed interactions based on the first individual managing the virtual representation in the second mode, and sending of one or more requests for access to data that is not permissioned; and
enable, through the rendered interface in the second mode, data management of the virtual representation by the first individual, wherein the data management comprises: the automatic iterative updating of the virtual representation with the data corresponding to the first individual, permissioning data for access by one or more other individuals including at least the second individual based on a categorization of the one or more other individuals, selecting the one or more allowed interactions for the second individual, and receiving the one or more requests for access to the data that is not permissioned.

2. The apparatus of claim 1, wherein enabling, through the rendered interface in the first mode, communication between the virtual representation of the first individual and the second individual, and permissioned access to the data by the second individual further comprises:
receiving a voice input of the second individual;
converting the voice input to a text input; and
deriving an intent for the text input.

3. The apparatus of claim 2, wherein enabling, through the rendered interface in the first mode, communication between the virtual representation of the first individual and the second individual, and permissioned access to the data by the second individual further comprises:
identifying a service corresponding to the derived intent.

4. The apparatus of claim 3, wherein enabling, through the rendered interface in the first mode, communication between the virtual representation of the first individual and the second individual, and permissioned access to the data by the second individual further comprises:
confirming permissioned access exists for the second individual for the identified service; and
causing execution of the identified service upon successful confirmation that permissioned access exists for the second individual.

5. The apparatus of claim 4, wherein enabling, through the rendered interface in the first mode, communication between the virtual representation of the first individual and the second individual, and permissioned access to the data by the second individual further comprises:
receiving a text input representing results of the execution of the identified service;
converting the text input to a voice output; and
presenting the voice output to the second individual.

6. The apparatus of claim 5, wherein the voice output presented to the second individual is presented in a voice of the first individual.

7. The apparatus of claim 6, wherein the voice output presented to the second individual is synchronized with an animation associated with the virtual representation of the first individual rendered on the interface.

8. The apparatus of claim 3, wherein the identified service comprises a web service associated with a data management application.

9. The apparatus of claim 1, wherein the processing platform comprising the at least one processor and the at least one memory storing computer program instructions is associated with a client device of an employee of an organization.

10. The apparatus of claim 1, wherein the processing platform comprising the at least one processor and the at least one memory storing computer program instructions is associated with a server of an organization.

11. The apparatus of claim 1, wherein the virtual representation of the first individual is a digital twin of the first individual.

12. A method, comprising:
rendering an interface comprising a virtual representation of a first individual, wherein the rendered interface is configured to selectively operate in a first mode and a second mode, the virtual representation of the first individual being automatically iteratively updated in the second mode with data corresponding to the first individual;

in response to the first individual setting an availability status as being unavailable, enable, through the rendered interface in the first mode: communication between the virtual representation of the first individual and a second individual in response to one or more communication requests from the second individual, permissioned access to data by the second individual through one or more allowed interactions based on the first individual managing the virtual representation in the second mode, and sending of one or more requests for access to data that is not permissioned; and enabling, through the rendered interface in the second mode, data management of the virtual representation by the first individual, wherein the data management comprises: the automatic iterative updating of the virtual representation with the data corresponding to the first individual, permissioning data for access by one or more other individuals including at least the second individual based on a categorization of the one or more other individuals, selecting the one or more allowed interactions for the second individual, and receiving the one or more requests for access to the data that is not permissioned;

wherein the method is performed by a processing platform comprising at least one processor coupled to at least one memory executing program code.

13. The method of claim 12, wherein enabling, through the rendered interface in the first mode, communication between the virtual representation of the first individual and the second individual, and permissioned access to the data by the second individual further comprises:

receiving a voice input of the second individual;
converting the voice input to a text input; and
deriving an intent for the text input.

14. The method of claim 13, wherein enabling, through the rendered interface in the first mode, communication between the virtual representation of the first individual and the second individual, and permissioned access to the data by the second individual further comprises:

identifying a service corresponding to the derived intent.

15. The method of claim 14, wherein enabling, through the rendered interface in the first mode, communication between the virtual representation of the first individual and the second individual, and permissioned access to the data by the second individual further comprises:

confirming permissioned access exists for the second individual for the identified service; and
causing execution of the identified service upon successful confirmation that permissioned access exists for the second individual.

16. The method of claim 15, wherein enabling, through the rendered interface in the first mode, communication between the virtual representation of the first individual and the second individual, and permissioned access to the data by the second individual further comprises:

receiving a text input representing results of the execution of the identified service;
converting the text input to a voice output; and
presenting the voice output to the second individual.

17. The method of claim 12, wherein enabling, through the rendered interface in the first mode, communication between the virtual representation of the first individual and the second individual, and permissioned access to the data by the second individual further comprises:

presenting a voice output to the second individual in a voice of the first individual, and wherein the voice output presented to the second individual is synchronized with an animation associated with the virtual representation of the first individual rendered on the interface.

18. The method of claim 12, wherein the virtual representation of the first individual is a digital twin of the first individual.

19. A computer program product stored on a non-transitory computer-readable medium and comprising machine executable instructions, the machine executable instructions, when executed, causing a processing device to perform steps of:

rendering an interface comprising a virtual representation of a first individual, wherein the rendered interface is configured to selectively operate in a first mode and a second mode, the virtual representation of the first individual being automatically iteratively updated in the second mode with data corresponding to the first individual;

in response to the first individual setting an availability status as being unavailable, enabling through the rendered interface in the first mode: communication between the virtual representation of the first individual and a second individual in response to one or more communication requests from the second individual, permissioned access to data by the second individual through one or more allowed interactions based on the first individual managing the virtual representation in the second mode, and sending of one or more requests for access to data that is not permissioned; and enabling, through the rendered interface in the second mode, data management of the virtual representation by the first individual, wherein the data management comprises: the automatic iterative updating of the virtual representation with the data corresponding to the first individual, permissioning data for access by one or more other individuals including at least the second individual based on a categorization of the one or more other individuals, selecting the one or more allowed interactions for the second individual, and receiving the one or more requests for access to the data that is not permissioned.

20. The computer program product of claim 19, wherein the virtual representation of the first individual is a digital twin of the first individual.

* * * * *